(12) United States Patent
Manago et al.

(10) Patent No.: US 9,817,985 B2
(45) Date of Patent: Nov. 14, 2017

(54) CONTENT MANAGEMENT SYSTEM, CONTENT MANAGEMENT SERVER AND MANAGEMENT PROGRAM FOR SERVER, CLIENT TERMINAL AND MANAGEMENT PROGRAM FOR TERMINAL, AND REMOVABLE MEDIA

(71) Applicants: Tatsuo Manago, Kasukabe (JP); Hideki Mizukami, Tokyo (JP)

(72) Inventors: Tatsuo Manago, Kasukabe (JP); Hideki Mizukami, Tokyo (JP)

(73) Assignees: Tasuo Manago, Kasukabe-shi (JP); Hideki Mizukami, Tokyo (JP)

( * ) Notice: Subject to any disclaimer, the term of this patent is extended or adjusted under 35 U.S.C. 154(b) by 0 days.

(21) Appl. No.: 15/118,283

(22) PCT Filed: May 13, 2015

(86) PCT No.: PCT/JP2015/002439
§ 371 (c)(1),
(2) Date: Aug. 11, 2016

(87) PCT Pub. No.: WO2016/002121
PCT Pub. Date: Jan. 7, 2016

(65) Prior Publication Data
US 2016/0357977 A1 Dec. 8, 2016

(30) Foreign Application Priority Data

Jun. 30, 2014 (JP) ................................. 2014-133647

(51) Int. Cl.
*G06F 21/62* (2013.01)
*G06F 21/60* (2013.01)
(Continued)

(52) U.S. Cl.
CPC ........ *G06F 21/6209* (2013.01); *G06F 21/604* (2013.01); *G06F 21/6281* (2013.01);
(Continued)

(58) Field of Classification Search
CPC .... G06F 21/604; G06F 21/6209; G06F 21/79; G06F 21/6272; H04L 63/10
See application file for complete search history.

(56) References Cited

U.S. PATENT DOCUMENTS 9,218,381 B2 * 12/2015 Joshi ................. G06F 17/30321
2006/0004770 A1 * 1/2006 Nakano ............... H04L 67/1095
(Continued)

FOREIGN PATENT DOCUMENTS

JP          11-219329 A      8/1999
JP          2003-233795 A    8/2003
(Continued)

OTHER PUBLICATIONS

International Search Report dated Aug. 11, 2015, issued in counterpart International Application No. PCT/JP2015/002439 (2 pages).
(Continued)

*Primary Examiner* — Beemnet Dada
(74) *Attorney, Agent, or Firm* — Westerman, Hattori, Daniels & Adrian, LLP (57) ABSTRACT

A content management system including a content management server and a client terminal connected to the content management server via a communication network, wherein the content management server transmits, to the client terminal, a management server ID identifying the content management server and a content deletion request, the client terminal receives the management server ID and the content deletion request from the content management server, determines whether or not the received management server ID
(Continued)

matches a management server ID saved on the client terminal side, and if they match, deletes the content saved on the client terminal side, in a removable media, the content corresponding to the deletion request. A content, that is saved in various forms on the client terminal side is disabled for playback at an appropriate timing; accordingly, it is possible to reduce risks such as information leakage to ensure security, and also ensure content integrity.

9 Claims, 7 Drawing Sheets

(51) Int. Cl.
    *G06F 21/79*         (2013.01)
    *H04L 29/06*        (2006.01)

(52) U.S. Cl.
    CPC .............. *G06F 21/79* (2013.01); *H04L 63/10* (2013.01); *G06F 21/6272* (2013.01); *G06F 2221/2143* (2013.01)

(56) References Cited

U.S. PATENT DOCUMENTS

2006/0161635 A1* 7/2006 Lamkin ............. G06F 17/30041
                                                    709/217
2010/0023774 A1    1/2010 Matsuzaki et al.

FOREIGN PATENT DOCUMENTS

| JP | 2003-242037 A | 8/2003 |
|---|---|---|
| JP | 2006-18709 A | 1/2006 |
| JP | 2010-146426 A | 7/2010 |
| JP | 2012-256372 A | 12/2012 |
| WO | 2006/132371 A1 | 12/2006 |

OTHER PUBLICATIONS

Refusal Reason Notice dated Jan. 8, 2016, issued in counterpart Japanese Patent Application No. 2014-703004, w/English translation (8 pages).

\* cited by examiner

| Deletion necessity registration information | |
|---|---|
| Content ID | Deletion necessity information |
| 110*** | Deletion necessity |
| 210*** | Deletion necessity |
| 510*** | Deletion necessity |
| : | : |

Fig.3

| Management information stored in a removable media 40 | |
|---|---|
| Media identification number | 06****** |
| Group ID | ******** |
| Individual ID | ****** |
| Content ID | 510*** |
| View expiry date of the content | 2014/07/10 |
| Management server ID | ********** |

| Deletion completion information |||
|---|---|---|
| Content ID | Media identification number | Deletion information |
| 110✶✶✶ | ✶✶03✶✶✶✶✶✶✶ | Delete completed |
| 510✶✶✶ | ✶✶06✶✶✶✶✶✶✶ | Delete completed |
| 510✶✶✶ | ✶✶07✶✶✶✶✶✶✶ | Delete completed |

| Management information stored in a storage unit 22 of a client terminal 20 | |
|---|---|
| Terminal identification number | 08******* |
| Group ID | ******** |
| Individual ID | ****** |
| Content ID | 810*** |
| View expiry date of the content | 2014/08/10 |
| Management server ID | *********** |

ID and a request to delete or disable playback of a
CONTENT MANAGEMENT SYSTEM, CONTENT MANAGEMENT SERVER AND MANAGEMENT PROGRAM FOR SERVER, CLIENT TERMINAL AND MANAGEMENT PROGRAM FOR TERMINAL, AND REMOVABLE MEDIA

TECHNICAL FIELD

The present invention relates to a content management system, a content management server and a management program for the server, a client terminal and a management program for the terminal, and a removable media used in the content management system, which ensure security by disabling playback of a required content such as a document saved on the client terminal side.

BACKGROUND ART

A management system that deletes a document saved in a client terminal to ensure security conventionally includes management systems of Patent Documents 1 and 2. The system allows an approver to input login information such as a user ID and a password into the client terminal to connect the client terminal to a document management server, and allows the client terminal to receive an approval matter from the document management server, acquire a document file attendant on the approval matter, and save the document file temporarily, and further allows the client terminal to delete the temporarily saved document file after an instruction on the next work process.

CITATION LIST

Patent Literatures

Patent Document 1: JP-A-2010-146426
Patent Document 2: JP-A-2012-256372

DISCLOSURE OF THE INVENTION

Problems to be Solved by the Invention

The systems of Patent Documents 1 and 2 can delete a document temporarily saved in a client terminal in accordance with an approval flow, but cannot handle the scene where a document is saved in various forms on the client terminal side such as a case where a document is saved in the client terminal by being downloaded in a flow other than the approval flow, a case where the document is saved in the client terminal via a removable media that is attached and detached, or a case where a document is saved in a removable media. Hence, a system is required which can delete a document that is saved in various forms on the client terminal side, and reduce risks such as information leakage to ensure security.

The present invention is proposed considering the above problem, and an objective thereof is to provide a content management system, a content management server and a management program for the server, a client terminal and a management program for the terminal, and a removable media used in the content management system, which, at an appropriate timing, disable playback of a content, such as a document, that is saved in various forms on the client terminal side, and accordingly, reduce risks such as information leakage to ensure security and also ensure content integrity.

Solutions to the Problems

A content management system of the present invention includes: a content management server, and a client terminal configured to be connected to the content management server via a communication network, wherein the content management server transmits, to the client terminal, a management server ID identifying the content management server and a request to delete or disable playback of a content, and the client terminal receives the management server ID and the request to delete or disable the playback of the content from the content management server, determines whether or not the received management server ID matches a management server ID saved on the client terminal side, and upon they matching, deletes or disables the playback of the content saved on the client terminal side, the content corresponding to the deletion request or playback disabling request.

According to this, it is possible to disable the playback of a content, such as a document, that is saved in various forms on the client terminal side at an appropriate timing at the deletion or playback disabling request of the content management server; accordingly, it is possible to reduce risks such as information leakage to ensure security in content management. Moreover, it is possible to disable the playback of the content in various circumstances at various timings such as the end of a project and an employee leaving his/her job. Therefore, flexibility in content management is excellent. Moreover, the management server is checked upon the deletion or playback disabling process. Therefore, it is possible to disable the playback of the content only at the request of a specific management server; accordingly, it is possible to prevent the occurrence of a situation where the content unexpectedly becomes impossible to be played back and ensure content integrity.

In the content management system of the present invention, the management server ID and the content, which are saved on the client terminal side, are stored and saved in a removable media connected for communication by detachable attachment to the client terminal, and the client terminal determines whether or not the received management server ID matches a management server ID saved in the removable media, and upon they matching, deletes or disables for playback of the content saved in the removable media, the content corresponding to the deletion request or playback disabling request.

According to this, it is adapted to a case where the content such as material for a project is stored and distributed in the removable media. It is possible to disable the playback of the content in the distributed removable media at an appropriate timing. The content in the removable media such as an SD card that is easy to be taken out to the outside is disabled for playback. Accordingly, it is possible to further reduce the risks such as information leakage, and further increase the security in content management. Moreover, the check with the management server ID in the removable media enables disabling of the playback of the content in the removable media only at the request of a specific management server, accordingly, it is possible to prevent the occurrence of a situation where the content in the removable media unexpectedly becomes impossible to be played back and ensure the content integrity.

In the content management system of the present invention, an identification number of the removable media is stored and saved in the removable media, and in response to completion of the process of deleting or disabling the playback of the content, the client terminal transmits process completion information and the identification number of the removable media to the content management server.

According to this, it is possible on the management server side to grasp and trace, for example, that the content stored in which removable media among the distributed removable medias has been deleted, and that the content stored in which removable media still remains; accordingly, it is possible to further increase the security in content management.

In the content management system of the present invention, at the time of recognition of a content ID corresponding to the content, the client terminal transmits, to the content management server, the content ID and a check request for deletion or disabling the playback of the content, and the content management server checks deletion necessity or playback disabling necessity registration information where whether or not the content ID corresponding to the check request is required to be deleted or disabled for playback is stored and saved, and upon the content ID being required to be deleted or disabled for playback, transmits the request to delete or disable the playback of the content corresponding to the content ID.

According to this, at the time of recognition of the content ID such as at the time of attachment of the removable media and at the time of playback of the content, it is frequently checked whether or not the content needs to be deleted or disabled for playback. If the content is applicable, it can be deleted or disabled for playback. In addition, if the content ID is recognized, it is possible to check whether or not deletion or disabling of playback is required. Accordingly, the coverage of search for the content targeted for deletion or disabling of playback is also excellent; therefore, the security in content management can be further increased.

In the content management system of the present invention, the content is saved on the client terminal side, corresponding to a view expiry date, and the client terminal side deletes or disables the playback of the content corresponding to the view expiry date in response to recognition that the view expiry date is due.

According to this, it is possible to disable the playback of the content in synchronization with the view expiry date such as an end date of a project. It is possible to doubly disable the playback of the content in combination with the process based on the request of the content management server and further increase the security in content management.

A content management server of the present invention is a content management server to be connected to a client terminal via a communication network, the content management server being configured to, to the client terminal for determining whether or not a received management server ID matches a management server ID saved on the client terminal side, and upon they matching, deleting or disabling playback of a content saved on the client terminal side, the content corresponding to a received request to delete or disable the playback of the content, transmit the management server ID identifying the content management server and the request to delete or disable playback of the content.

According to this, it is possible to disable the playback of the content, such as a document, that is saved in various forms on the client terminal side at an appropriate timing at the deletion or playback disabling request of the content management server, accordingly, it is possible to reduce the risks such as information leakage and ensure the security in content management. Moreover, it is possible to disable the playback of the content in various circumstances at various timings such as the end of a project and an employee leaving his/her job. Therefore, the flexibility in content management is excellent. Moreover, the management server is checked upon the deletion or playback disabling process. Therefore, it is possible to disable the playback of the content only at the request of a specific management server; accordingly, it is possible to prevent the occurrence of a situation where the content unexpectedly becomes impossible to be played back and ensure the content integrity.

In the content management server of the present invention, upon the client terminal transmitting a content ID corresponding to the content and a check request for deletion or disabling of the playback of the content at the time of recognition of the content ID, the content management server checks deletion necessity or playback disabling necessity registration information where whether or not the content ID corresponding to the check request for deletion or disabling the playback of the content, the check request being received from the client terminal, is required to be deleted or disabled for playback is stored and saved, in accordance with the check request, and upon the content ID being required to be deleted or disabled for playback, transmits the request to delete or disable the playback of the content corresponding to the content ID.

According to this, at the time of recognition of the content ID such as at the time of attachment of the removable media and at the time of playback of the content, it is frequently checked whether or not the content needs to be deleted or disabled for playback. If the content is applicable, it can be deleted or disabled for playback. In addition, if the content ID is recognized, it is possible to check whether or not deletion or disabling of playback is required. Accordingly, the coverage of search for the content targeted for deletion or disabling of playback is also excellent; therefore, the security in content management can be further increased.

A management program for a server of the present invention causes a server to function as a unit for, to a client terminal for determining whether or not a received management server ID matches a management server ID saved on the client terminal side, and upon they matching, deleting or disabling playback of a content saved on the client terminal side, the content corresponding to a received request to delete or disable the playback of the content, transmitting the management server ID identifying the content management server and the request to delete or disable the playback of the content via a communication network.

According to this, it is possible to disable the playback of the content, such as a document, that is saved in various forms on the client terminal side at an appropriate timing at the deletion or playback disabling request of the content management server, accordingly, it is possible to reduce the risks such as information leakage and ensure the security in content management. Moreover, it is possible to disable the playback of the content in various circumstances at various timings such as the end of a project and an employee leaving his/her job. Therefore, the flexibility in content management is excellent. Moreover, the management server is checked upon the deletion or playback disabling process. Therefore, it is possible to disable the playback of the content only at the request of a specific management server; accordingly, it is possible to prevent the occurrence of a situation where the content unexpectedly becomes impossible to be played back and ensure the content integrity.

A client terminal of the present invention is a client terminal to be connected to a content management server via a communication network, the client terminal being configured to, in accordance with a management server ID received from the content management server, the management server ID identifying the content management server, and a request to delete or disable playback of a content, determine whether or not the management server ID matches a management server ID saved on the client terminal side, and upon they matching, delete or disable the playback of the content saved on the client terminal side, the content corresponding to the deletion or playback disabling request.

According to this, it is possible to disable the playback of the content, such as a document, that is saved in various forms on the client terminal side at an appropriate timing at the deletion or playback disabling request of the content management server, accordingly, it is possible to reduce the risks such as information leakage and ensure the security in content management. Moreover, it is possible to disable the playback of the content in various circumstances at various timings such as the end of a project and an employee leaving his/her job. Therefore, the flexibility in content management is excellent. Moreover, the management server is checked upon the deletion or playback disabling process. Therefore, it is possible to disable the playback of the content only at the request of a specific management server; accordingly, it is possible to prevent the occurrence of a situation where the content unexpectedly becomes impossible to be played back and ensure the content integrity.

In the client terminal of the present invention, the management server ID and the content, which are saved on the client terminal side, are stored and saved in a removable media connected for communication by detachable attachment to the client terminal, and whether or not the received management server ID matches a management server ID saved in the removable media is determined, and upon they matching, the content saved in the removable media, the content corresponding to the deletion request or playback disabling request, is deleted or disabled for playback.

According to this, it is adapted to a case where the content such as material for a project is stored and distributed in the removable media. It is possible to disable the playback of the content in the distributed removable media at an appropriate timing. The content in the removable media such as an SD card that is easy to be taken out to the outside is disabled for playback. Accordingly, it is possible to further reduce the risks such as information leakage, and further increase the security in content management. Moreover, the check with the management server ID in the removable media enables disabling of the playback of the content in the removable media only at the request of a specific management server, accordingly, it is possible to prevent the occurrence of a situation where the content in the removable media unexpectedly becomes impossible to be played back and ensure the content integrity.

In the client terminal of the present invention, an identification number of the removable media is stored and saved in the removable media, and in response to completion of the process of deleting or disabling the playback of the content, process completion information and the identification number of the removable media are transmitted to the content management server.

According to this, it is possible on the management server side to grasp and trace, for example, that the content stored in which removable media among the distributed removable medias has been deleted, and that the content stored in which removable media still remains; accordingly, it is possible to further increase the security in content management.

A management program for a terminal of the present invention causes a client terminal to function as a unit for, in accordance with a management server ID received from a content management server via a communication network, the management server ID identifying the content management server, and a request to delete or disable playback of a content, determining whether or not the management server ID matches a management server ID saved on the client terminal side, and upon they matching, deleting or disabling the playback of the content saved on the client terminal side, the content corresponding to the deletion request or playback disabling request.

According to this, it is possible to disable the playback of the content, such as a document, that is saved in various forms on the client terminal side at an appropriate timing at the deletion or playback disabling request of the content management server, accordingly, it is possible to reduce the risks such as information leakage and ensure security in content management. Moreover, it is possible to disable the playback of the content in various circumstances at various timings such as the end of a project and an employee leaving his/her job. Therefore, the flexibility in content management is excellent. Moreover, the management server is checked upon the deletion or playback disabling process. Therefore, it is possible to disable the playback of the content only at the request of a specific management server; accordingly, it is possible to prevent the occurrence of a situation where the content unexpectedly becomes impossible to be played back and ensure the content integrity.

In the management program for a terminal of the present invention causes the client terminal, in a configuration where the management server ID and the content, which are saved on the client terminal side, are stored and saved in a removable media connected for communication by detachable attachment to the client terminal, to function as a unit for determining whether or not the received management server ID matches the management server ID saved in the removable media, and upon they matching, deleting or disabling the playback of the content saved in the removable media, the content corresponding to the deletion request or playback disabling request.

According to this, it is adapted to a case where the content such as material for a project is stored and distributed in the removable media. It is possible to disable the playback of the content in the distributed removable media at an appropriate timing. The content in the removable media such as an SD card that is easy to be taken out to the outside is disabled for playback. Accordingly, it is possible to further reduce the risks such as information leakage, and further increase the security in content management. Moreover, the check with the management server ID in the removable media enables disabling of the playback of the content in the removable media only at the request of a specific management server; accordingly, it is possible to prevent the occurrence of a situation where the content in the removable media unexpectedly becomes impossible to be played back and ensure the content integrity.

In the management program for a terminal of the present invention causes the client terminal, in a configuration where an identification number of the removable media is stored and saved in the removable media, to function as a unit for, in response to completion of the process of deleting or disabling the playback of the content, transmitting process completion information and the identification number of the removable media to the content management server.

According to this, it is possible on the management server side to grasp and trace, for example, that the content stored in which removable media among the distributed removable medias has been deleted, and that the content stored in which removable media still remains: accordingly, it is possible to further increase the security in content management.

A removable media of the present invention is a removable media to be used in a system in which a content management server and a client terminal are connected via a communication network, the content management server transmits, to the client terminal, a management server ID identifying the content management server and a request to delete or disable playback of a content, the client terminal determines whether or not the management server ID matches a management server ID saved on the client terminal side in accordance with the management server ID and the request to delete or disable the playback of the content, which are received from the content management server, and upon they matching, deletes or disables the playback of the content saved on the client terminal side, the content corresponding to the deletion request or playback disabling request, the removable media being configured to be detachably attached directly or via a removable media reading apparatus to the client terminal and connected for communication to the client terminal, and store and save the management server ID saved on the client terminal side and a content being able to be deleted or disabled for playback in accordance with the deletion request or playback disabling request.

According to this, it is adapted to a case where the content such as material for a project is stored and distributed in the removable media. It is possible to disable the playback of the content in the distributed removable media at an appropriate timing. The content in the removable media such as an SD card that is easy to be taken out to the outside is disabled for playback. Accordingly, it is possible to further reduce the risks such as information leakage, and further increase the security in content management. Moreover, it is possible to disable the playback of the content in various circumstances at various timings such as the end of the project and an employee leaving his/her job. Therefore, the flexibility in content management is excellent. Moreover, the check with the management server ID in the removable media enables disabling of the playback of the content in the removable media only at the request of a specific management server, accordingly, it is possible to prevent the occurrence of a situation where the content in the removable media unexpectedly becomes impossible to be played back and ensure the content integrity.

Effects of the Invention

According to the present invention, it is possible to disable the playback of a content, such as a document, that is saved in various forms on a client terminal side at an appropriate timing at a deletion or playback disabling request of a content management server, accordingly, it is possible to reduce risks such as information leakage and ensure security in content management. Moreover, it is possible to disable the playback of the content in various circumstances at various timings such as the end of a project and an employee leaving his/her job. Therefore, flexibility in content management is excellent. Moreover, a management server is checked upon a deletion or playback disabling process. Therefore, it is possible to disable the playback of the content only at the request of a specific management server; accordingly, it is possible to prevent the occurrence of a situation where the content unexpectedly becomes impossible to be played back and ensure content integrity.

MODE FOR CARRYING OUT THE INVENTION

[Content Management System of Embodiment]

Figure 1:
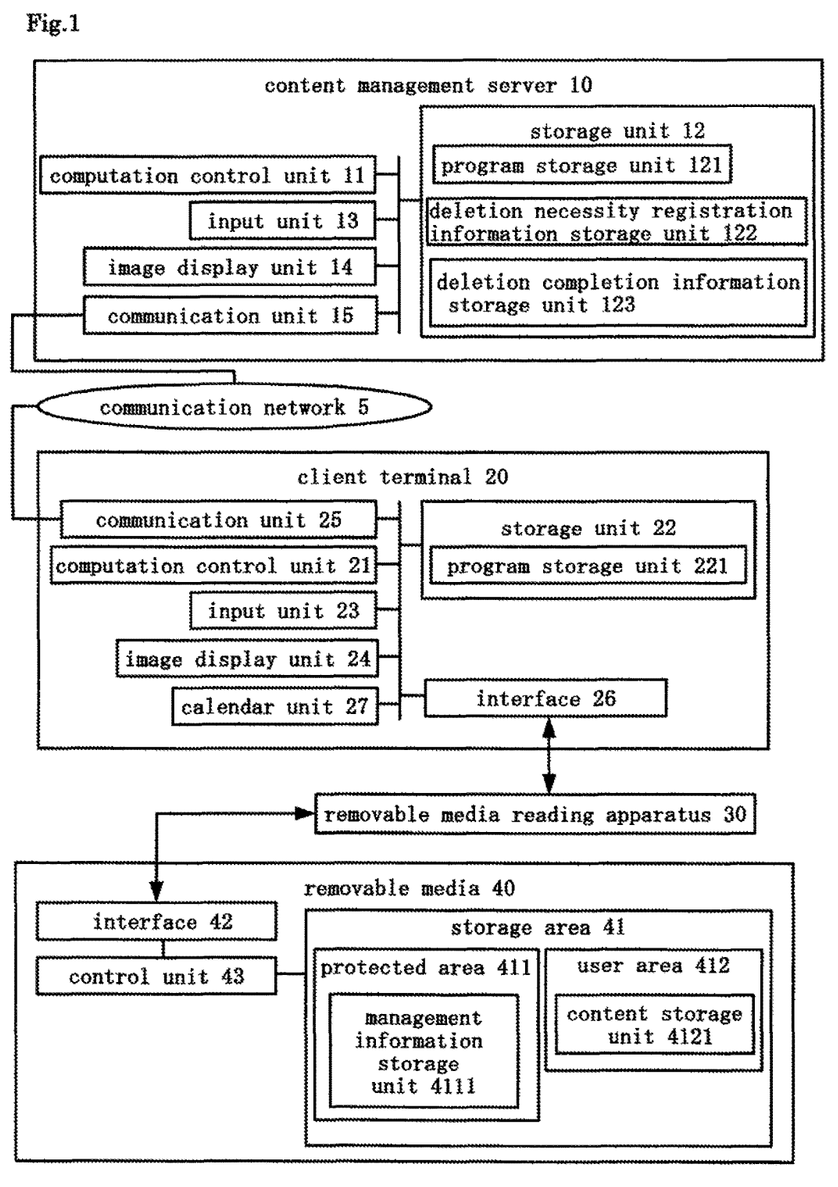
FIG. 1 is a block diagram illustrating the entire configuration of a content management system according to an embodiment of the present invention.

As illustrated in FIG. 1, a content management system according to an embodiment of the present invention includes a content management server 10, and a client terminal 20 that is connected to the content management server via an internal such as in-house, or external such as the Internet, communication network 5. The client terminal 20 is provided with a removable media reading apparatus 30 that is detachably attached, and a removable media 40 that is detachably attached to the removable media reading apparatus 30. A communication connection is established by the detachable attachment of the removable media 40 to the client terminal 20 via the removable media reading apparatus 30.

The content management server 10 includes a computation control unit 11 such as a CPU, a storage unit 12 comprised of a ROM, a RAM, a hard disk and the like, an input unit 13 such as a keyboard and a mouse, an image display unit 14 such as a liquid crystal display, and a communication unit 15 that establishes a communication connection with the client terminal 20 and the like via the communication network 5.

Figure 2:
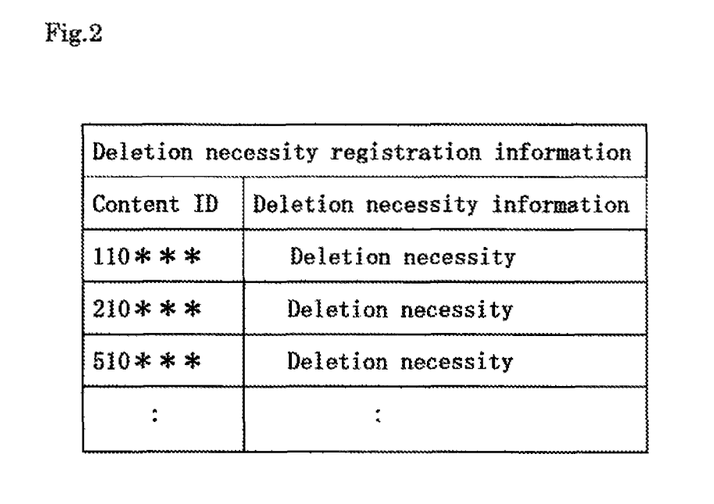
FIG. 2 is a diagram illustrating deletion necessity registration information stored in a content management server according to the embodiment.

The storage unit 12 includes, in the hard disk or the like, a program storage unit 121 in which predetermined control programs such as a management program for the server that allows execution of a content management process on the server side is stored, a deletion necessity registration information storage unit 122 in which registration information of a content ID identifying a content required to be deleted is stored as illustrated in FIG. 2, and a deletion completion information storage unit 123 in which a content ID of a content that has been completed being deleted and a media identification number of the removable media 40 are brought into correspondence with each other and stored. The computation control unit 11 executes predetermined processes in accordance with predetermined control programs such as the management program for the server.

The client terminal 20 is a terminal that can play back a content and execute the content management process described below, for example, a multifunctional mobile terminal such as a smartphone, and a personal computer. The client terminal 20 includes a computation control unit 21 such as a CPU, a storage unit 22 comprised of a ROM, a RAM, a hard disk, and the like, an input unit 23 such as a touchscreen, a keyboard, and a mouse, an image display unit 24 such as a liquid crystal display, a communication unit 25 that establishes a communication connection with the content management server 10 and the like via the communication network 5, an interface 26, such as a USB port, that communicates with the removable media reading apparatus 30 that can be detachably attached to the interface 26, and a calendar unit 27 that measures a date and time.

The storage unit 22 includes, in the hard disk or the like, a program storage unit 221 in which predetermined control programs such as a management program for the terminal that allows execution of the content management process described below and a content playback program that allows playback of a content are stored. The computation control unit 21 executes predetermined processes in accordance with predetermined control programs such as the management program for the terminal and the content playback program.

The removable media reading apparatus 30 is, for example, a card reader such as an SD card reader. The removable media reading apparatus 30 includes a computation control unit such as a CPU, a storage unit comprised of a ROM, a RAM, and the like, a terminal-side interface, such as a USB port, that can be detachably attached to the client terminal 20 and communicates with the client terminal 20, and a media-side interface, such as a card slot, that communicates with the removable media 40 that can be detachably attached to the media-side interface. The present invention can also be applied even with a configuration where the client terminal 20 itself is provided with a media-side interface, such as a card slot, that communicates with the removable media 40 that can be detachably attached to the media-side interface, and the removable media 40 is attached directly to the client terminal 20.

The removable media 40 is, for example, a small memory card such as an SD card. The removable media 40 includes a storage area 41, an interface 42 being a circuit that communicates with the removable media reading apparatus 30, and a control unit 43 being a circuit that accesses the storage area 41 in accordance with a request input by the client terminal 20. The storage area 41 includes a protected area 411 that can be accessed only by a process in accordance with a specific program such as the management program for the terminal of the client terminal 20, and a user area 412 that can be freely accessed by a process in accordance with a normal program such as the content playback program of the client terminal 20.

Management information including a content ID specifying a content is stored in a management information storage unit 4111 in the protected area 411 of the storage area 41. The management information is stored in the protected area 411 that is protected to a high level, and accordingly is stored in the removable media 40 in a state of being restricted for access, and can be accessed and rewritten only when the access restriction is removed by a predetermined write program. The management information can be stored in the removable media 40 in a state of being appropriately restricted for access by, for example, being stored in the user area 412 in a state of being encrypted with an encryption key and being restricted for access.

Figure 3:
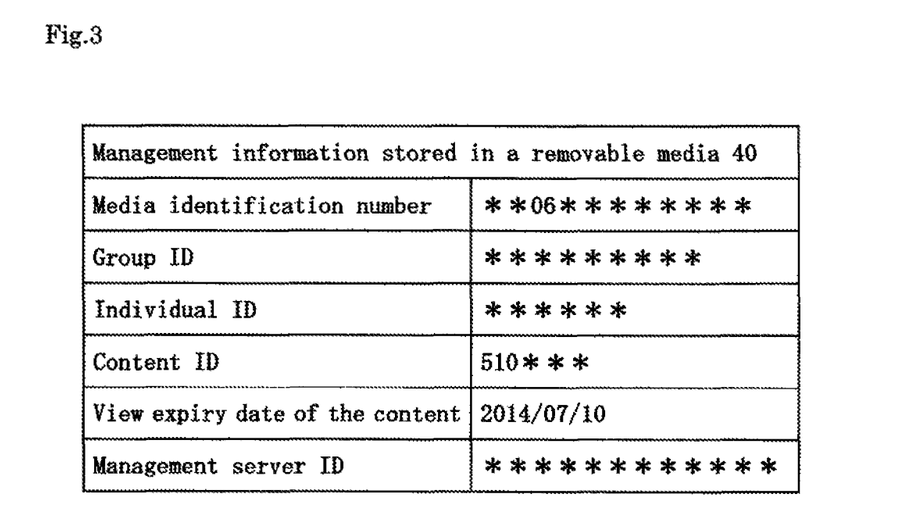
FIG. 3 is a diagram illustrating management information stored in a removable media according to the embodiment.

As illustrated in FIG. 3, the management information stored in the protected area 411 includes a media identification number that identifies the removable media 40 such as an SD card, a group ID that identifies a group, such as a company number, an individual ID that identifies an individual, such as an employee number that identifies an employee, a content ID that identifies a content stored in the removable media 40, a view expiry date of the content identified by the content ID, and a management server ID that identifies the content management server 10 that has the authorization to delete the content. Moreover, a content including a document, a moving image, a still image, audio, or an appropriate combination thereof, corresponds to the content ID in the user area 412, and is preferably stored in a content storage unit 4121 in a state of being copy-protected by, for example, CPRM, AACS, CPXM or AES.

It is also preferable to be configured such that the individual ID that identifies the individual is not stored in the management information of the removable media 40. Consequently, when the management information and the content are stored in the removable media 40 to be distributed within a company or the like, it becomes possible to store and distribute uniform information for a group. Therefore, it is possible to bring efficiency to an information setting operation on the removable media 40 and increase the convenience of distribution of the removable media 40.

Figure 4:
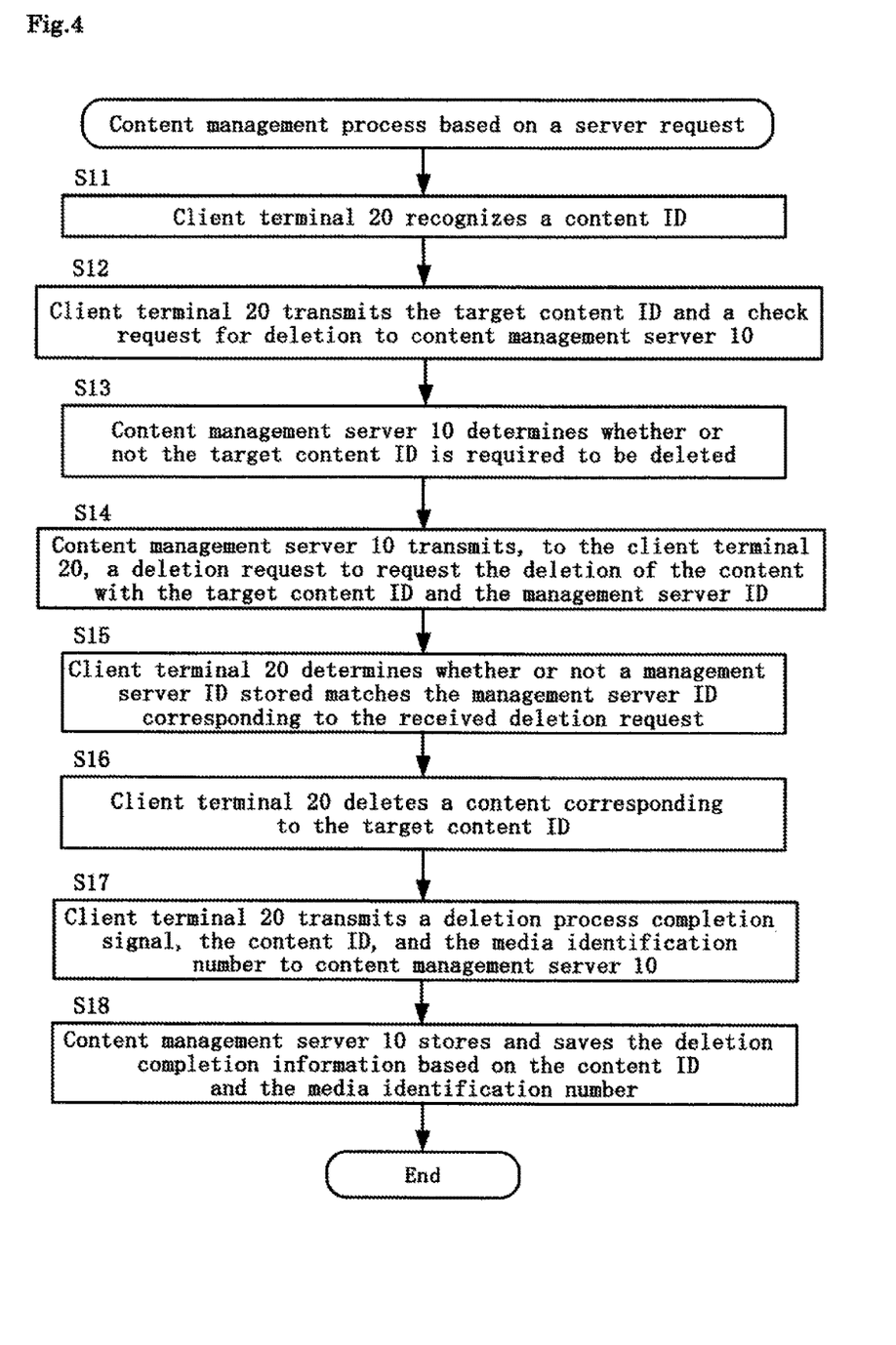
FIG. 4 is a flowchart illustrating a content management process based on a server request according to the embodiment.

Next, a description is given of the content management process based on a server request according to the embodiment. In a state where the removable media reading apparatus 30 is attached to the client terminal 20, the removable media 40 is attached to the removable media reading apparatus 30, and the management program for the terminal, for example, working with the content playback program or another content playback authentication program is in operation on the client terminal 20, as illustrated in FIG. 4, the computation control unit 21 of the client terminal 20 follows the management program for the terminal, recognizes a content ID stored in the storage area 41 by the removable media 40 in response to the completion of the content management process based on a due view expiry date described below, or in response to, for example, the establishment of the communication connection by the attachment of the removable media 40, the start of the management program for the terminal, or the input of a request for playback of a content saved in the removable media 40 if the content management process based on a due view expiry date is not performed (S11), and accesses the content management server 10 identified by the management server ID to transmit a check request for deletion and the target content ID (S12).

The computation control unit 11 of the content management server 10 follows the management program for the server, receives the content ID corresponding to the check request for deletion, checks the received content ID against a registration information table of content IDs that identify contents required to be deleted, the registration information table being stored in the deletion necessity registration information storage unit 122, and determines whether or not the target content ID is required to be deleted (S13). If the target content ID is not a deletion target, a deletion unnecessity signal indicating that the target content ID is not requested to be deleted is transmitted to the client terminal 20. The client terminal 20 then executes necessary processes such as a content playback process.

If the target content ID is required to be deleted, the content management server 10 transmits, to the client terminal 20, a deletion request to request the deletion of the content with the target content ID and the management server ID of the content management server 10 (S14).

The computation control unit 21 of the client terminal 20 follows the management program for the terminal, receives the deletion request for the content with the content ID required to be deleted, and the management server ID, and, in response to this, determines whether or not a management server ID that identifies the content management server 10 and is stored in the removable media 40 matches the management server ID corresponding to the received deletion request (S15). If they match, the computation control unit 21 deletes a content stored in the storage area 41 of the removable media 40, the content corresponding to the target content ID (S16). If they do not match, deletion is not performed.

Figure 5:
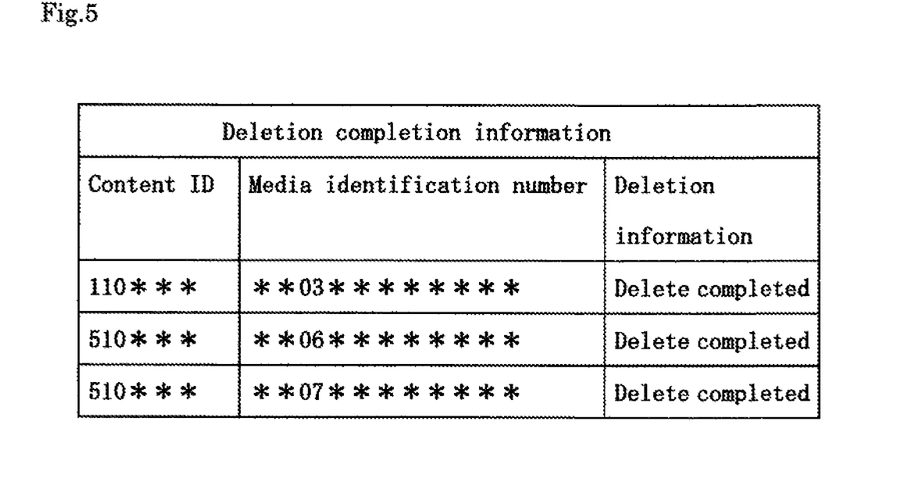
FIG. 5 is a diagram illustrating deletion completion information stored in the content management server according to the embodiment.

Upon completing the deletion, the computation control unit 21 follows the management program for the terminal, transmits a deletion process completion signal, the content ID of the deleted content, and the media identification number of the removable media 40 to the content management server 10 identified by the management server ID (S17). In the content management server 10, the computation control unit 11, which follows the management program for the server, receives them, and brings the media identification number into correspondence with the content ID of the deleted content to store and save them in the deletion completion information storage unit 123 (S18). If the content with the content ID has been deleted from the removable media 40, contents that can be played back are contents that have not been deleted and correspond to the remaining contents ID, or do not exist, on the client terminal 20 side.

A process of disabling the playback of a content can also be used instead of the content deletion process. In this case, a playback disabling process including requesting a check for the disabling of playback to the content management server 10 from the client terminal 20, checking a content ID targeted for the disabling of playback, making a determination, and transmitting a playback enabling signal or playback disabling request and a management server ID having the authorization to disable playback in the content management server 10, and making a determination about the matching of management server IDs and, for example, encrypting a content corresponding to the target content ID with an encryption key for disabling playback in the client terminal 20 is executed, and a process including transmitting the playback disabling process completion information, the processed content ID, and the media identification number from the client terminal 20 to the content management server 10, and bringing the content ID for which the playback disabling process has been completed into correspondence with the media identification number to store and save them in the content management server 10 is performed.

Figure 6:
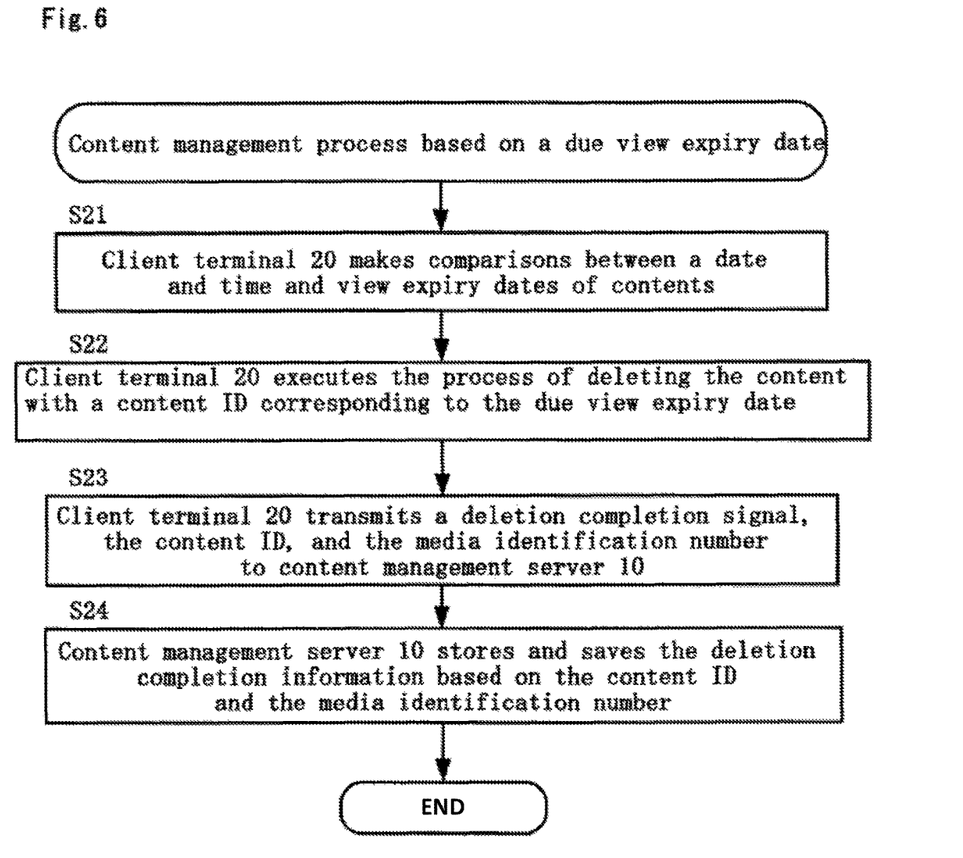
FIG. 6 is a flowchart illustrating a content management process based on a due view expiry date according to the embodiment.

Next, a description is given of the content management process based on a due view expiry date according to the embodiment. As described above, in the state where the removable media reading apparatus 30 is attached to the client terminal 20, the removable media 40 is attached to the removable media reading apparatus 30, and the management program for the terminal, for example, working with the content playback program or the other content playback authentication program is in operation on the client terminal 20, as illustrated in FIG. 6, the computation control unit 21 of the client terminal 20 makes comparisons between a date and time recognized by the calendar unit 27 and view expiry dates of contents stored in the removable media 30 in accordance with the management program for the terminal, in response to, for example, the establishment of the communication connection by the attachment of the removable media 40, the start of the management program for the terminal, or the input of a request for playback of a content saved in the removable media 40 (S21).

If there is a content whose view expiry date is due, the client terminal 20 executes the process of deleting the content with a content ID corresponding to the due view expiry date (S22), and upon completing the deletion process, transmits a deletion completion signal, the content ID of the deleted content, and the media identification number of the removable media 30 to the content management server 10 identified by the management server ID (S23). In the content management server 10, the computation control unit 11, which follows the management program for the server, receives them, and brings the media identification number into correspondence with the content ID of the deleted content to store and save them in the deletion completion information storage unit 123 (S24).

If a single or a plurality of all contents is before the view expiry dates, and for the remaining contents that are before the view expiry dates, the above-mentioned content management process based on a server request is executed. A required content is then played back. It is also possible in the content management process based on a due view expiry date to use a configuration where the content is disabled for playback instead of the deletion of the content. Alternatively, it is also possible to be configured such that only the content management process based on a server request is performed, and the content management process for deletion or disabling of playback based on a due view expiry date is not performed.

In the content management system according to the first embodiment, it is possible to disable the playback of a content, such as a document, that is saved in various forms on the client terminal 20 side, at an appropriate timing at the deletion or playback disabling request of the content management server 10; accordingly, it is possible to reduce risks such as information leakage and ensure security in content management. Especially, it can be adapted to a case where a content such as material for a project is stored and distributed in the removable media 40. The content in the removable media 40 such as an SD card that is easy to be taken out to the outside is disabled for playback at an appropriate timing to significantly reduce the risks such as information leakage.

Moreover, the deletion process and the playback disabling process based on the deletion request and the playback disabling request of the content management server 10 enables disabling of the playback of the content in various circumstances at various timings such as the end of a project and an employee leaving his/her job. Flexibility in content management is excellent.

Moreover, a check using a management server ID enables disabling of the playback of the content in the removable media 40 only at the request of a specific content management server 10. It is possible to prevent the occurrence of a situation where the content in the removable media 40 unexpectedly becomes impossible to be played back and ensure content integrity.

Moreover, the content management server 10 receives and saves the identification number of the removable media 40 transmitted from the client terminal 20 together with deletion information or the like. Accordingly, it is possible on the content management server 10 side to grasp and trace, for example, that the content stored in which removable media 40 among the distributed removable medias 40 has been deleted, and that the content stored in which removable media 40 still remains; accordingly, it is also possible to further increase the security in content management from such a point.

Moreover, at the time of recognition of the content ID such as at the time of attachment of the removable media 40 and at the time of playback of the content, it is frequently checked whether or not the content needs to be deleted or disabled for playback. If the content is applicable, it can be deleted or disabled for playback. In addition, if the content ID is recognized, it is possible to check whether or no deletion or disabling of playback is required. Accordingly, the coverage of search for the content targeted for deletion or disabling of playback is also excellent; therefore, the security in content management can also be further increased from such a point.

Moreover, a content due the view expiry date is deleted or disabled for playback. Accordingly, it is possible to disable the playback of the content in synchronization with the view expiry date such as the end date of a project. The playback of the content is doubly prevented in combination with the process based on the request of the content management server 10. The security in content management can also be further increased from such a point. Especially, if the identification number of the removable media 40, the deletion information, and the like are saved in the content management server 10, contents that, for example, have been deleted in both of the deletion and the like based on a due view expiry date and the deletion and the like based on a server request are brought into correspondence with the identification numbers of the removable medias 40 to be grasped collectively.

Modifications of the Embodiment, Etc

The invention disclosed in the description includes those determined by changing partial matters of each aspect and each embodiment to other matters disclosed in the description, or those determined by adding other matters disclosed in the description to the partial matters, or those conceptualized generically, which are determined by deleting the partial matters to a degree that the operations and effects can be partially obtained, within an applicable range, in addition to each aspect and each embodiment. The invention disclosed in the description also includes the following modifications.

For example, the storage location of a content, a management server ID, and a content ID, or the storage location of a content, can also be set as the storage unit 22 built in the client terminal 20 in addition to the configuration of being stored in the storage area 41 of the removable media 40 according to the embodiment. The present invention includes an appropriate configuration of saving a content on the client terminal 20 side, such as storing a content, a management server ID and a content ID, or a content in the storage unit 22 built in the client terminal 20 or a storage unit connected to the client terminal 20.

Figure 7:
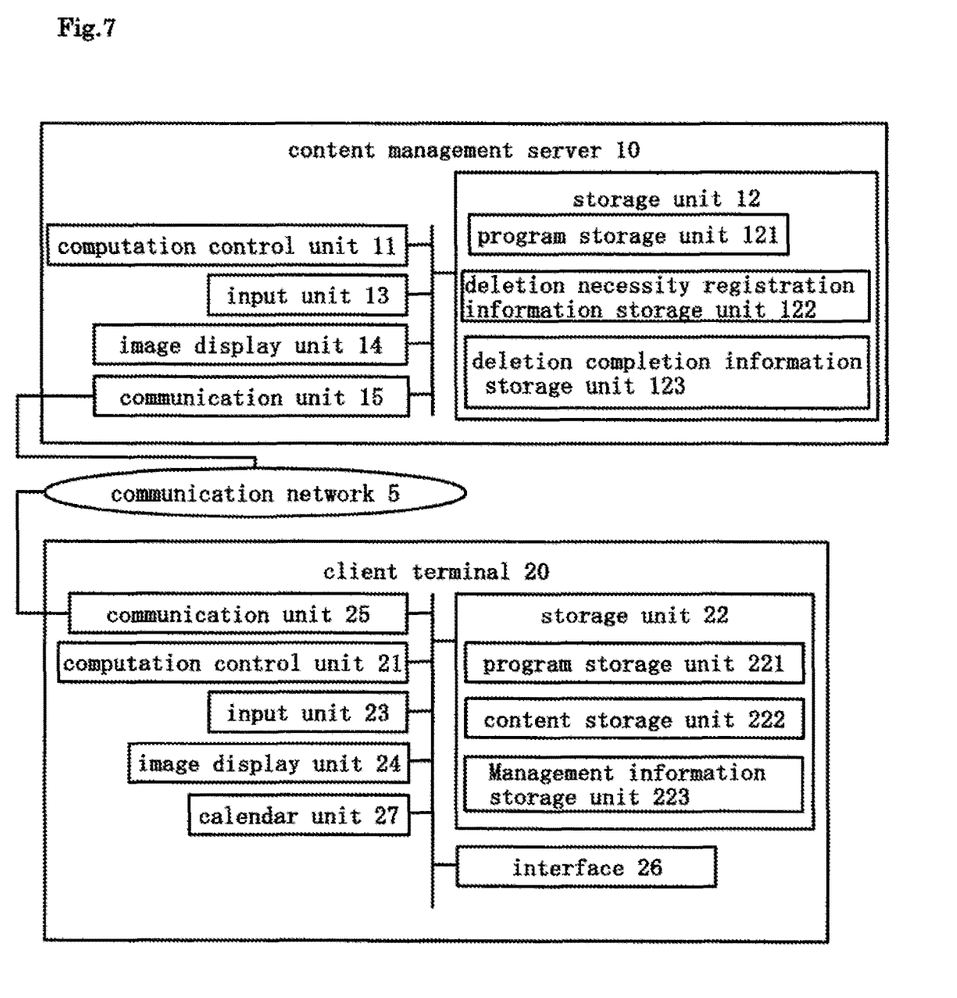
FIG. 7 is a block diagram illustrating the entire configuration of the content management system according to a modification of the embodiment of the present invention.
Figure 8:
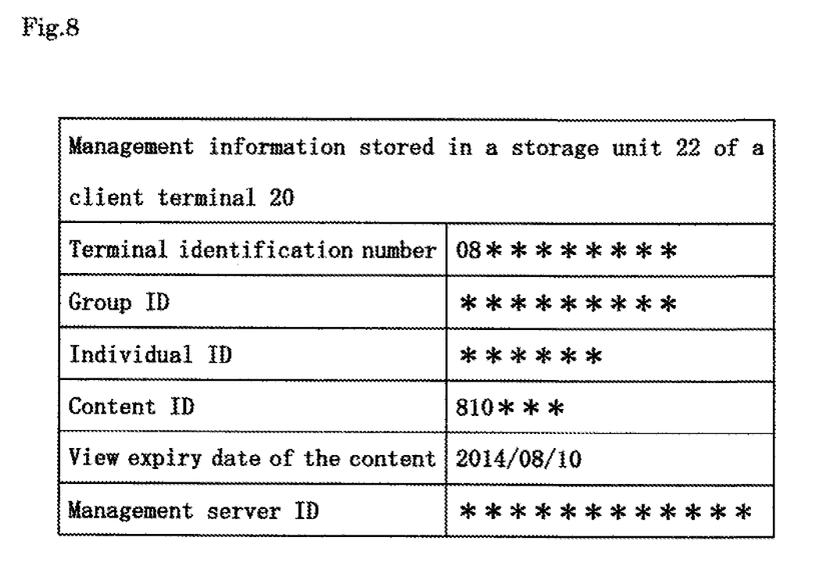
FIG. 8 is a diagram illustrating management information stored in a storage unit of a client terminal according to the modification of the embodiment.

As the example where a content, a management server ID, and a content ID are stored in the storage unit 22 of the client terminal 20, as illustrated in FIG. 7, the content is brought into correspondence with the content ID, and stored in a content storage unit 222, such as a hard disk, of the storage unit 22 built in the client terminal 20 in the state of being restricted for playback by encryption and the like, preferably in the state of being copy-protected, and also the management information is stored in a management information storage unit 223 in the state of being restricted for access by encryption with an encryption key and the like. As illustrated in FIG. 8, the management information can include, for example, a terminal identification number that identifies the client terminal 20, a group ID that identifies a group, such as a company number, an individual ID that identifies an individual, such as an employee number that identifies an employee, a content ID that identifies a content stored in the client terminal 20, a view expiry date of the content identified by the content ID, and a management server ID that identifies the content management server 10 having the authorization to delete the content.

In accordance with the management program for the terminal, the computation control unit 21 of the client terminal 20 compares a date and time recognized by the calendar unit 27 and view expiry dates of contents stored in the storage unit 22 in response to, for example, the start of the management program for the terminal, or the input of a request for playback of the content saved in the storage unit 22, if there is a content due the view expiry date, performs the deletion or playback disabling process on the content of a content ID corresponding to the due view expiry date, and transmits the completion signal, the content ID of the content deleted or the like, and the terminal identification number of the client terminal 20 to the content management server 10 identified by the management server ID upon completion of the deletion or playback disabling process. In the content management server 10, the computation control unit 11, which follows the management program for the server, receives them, and brings the terminal identification number into correspondence with the content ID of the content on which the deletion process or playback disabling process has been performed to store and save them in the deletion completion information storage unit 123 or the like.

Moreover, the computation control unit 21, which follows the management program for the terminal of the client terminal 20, recognizes a content ID stored in the storage unit 22 in response to the completion of the content management process based on a due view expiry date, or in response to, for example, the start of the management program for the terminal, or the input of a request for playback of a content saved in the storage unit 22 if the content management process based on a due view expiry date is not performed, and transmits a check request for deletion or disabling of playback and the target content ID to the content management server 10 identified by the management server ID. As in the embodiment, the content management server 10, for example, determines whether or not the content ID of the check request for deletion or the like is required to be deleted, or disabled for playback, and if the content ID of the check request is required to be deleted or disabled for playback, transmits a deletion request or the like of a content with the target content ID and the management server ID of the content management server 10.

The computation control unit 21, which follows the management program for the terminal of the client terminal 20, then determines whether or not the management server ID stored in the storage unit 22, the management server ID identifying the content management server 10, matches the management server ID corresponding to the received deletion request in response to the receipt of the deletion request or the like of the content with the content ID required to be deleted, and the management server ID and, if they match, executes the deletion process or playback disabling process on the content stored in the storage unit 22, the content corresponding to the target content ID.

Upon completing the deletion or playback disabling process, the process completion signal, the content ID of the content deleted or disabled for playback, and the terminal identification number of the client terminal 20 are transmitted to the content management server 10 identified by the management server ID. In the content management server 10, the computation control unit 11, which follows the management program for the server, receives them and brings the terminal identification number into correspondence with the content ID of the content on which the deletion process or playback disabling process has been performed to store and save them in the deletion completion information storage unit 123 or the like. In the client terminal 20, the required content is then played back.

If a content is stored in the storage unit 22 of the client terminal 20, and a management server ID and a content ID are stored as the management information of the removable media 40, the management server ID and the content ID, which are stored in the removable media 40, are used to perform the content management process based on a due view expiry date, the content management process based on a check request or server request, or the like in response to the satisfaction of the condition such as the establishment of the communication connection by the attachment of the removable media 40, the start of the management program for the terminal, or the input of a request for playback of a content stored in the storage unit 22. Moreover, it is also possible to be configured such that only the content management process based on a server request is performed, and the content management process for deletion or disabling of playback based on a due view expiry date is not performed, if a content, a management server ID, and a content ID, or a content is stored in the storage unit 22 or the like of the client terminal 20.

Moreover, the present invention can also be applied to a case where in, for example, the rental industry, a content is stored and distributed in a removable media such as an SD card, to be viewed on a multifunctional mobile terminal such as a smartphone, a personal computer, and the like, in addition to the management of a content such as an in-house document.

INDUSTRIAL APPLICABILITY

The present invention can be used, for example, in a case where materials are stored in an SD card, distributed to employees in a company, and deleted in response to the end of a project, or the like.

DESCRIPTION OF REFERENCE SIGNS

10 Content management server
11 Computation control unit
12 Storage unit
121 Program storage unit
122 Deletion necessity registration information storage unit
123 Deletion completion information storage unit
13 Input unit
14 Image display unit
15 Communication unit
20 Client terminal
21 Computation control unit
22 Storage unit
221 Program storage unit
222 Content storage unit
223 Management information storage unit
23 Input unit
24 Image display unit
25 Communication unit
26 Interface
27 Calendar unit
30 Removable media reading apparatus
40 Removable media
41 Storage area
411 Protected area
4111 Management information storage unit
412 User area
4121 Content storage unit
42 Interface
43 Control unit
5 Communication network

The invention claimed is:

1. A content management system comprising:
a content management server; and
a client terminal configured to be connected to the content management server via a communication network, wherein
a management server ID identifying the content management server, a content ID corresponding to content stored in a removable media, and an identification number of the removable media to be connected for communication by detachable attachment to the client terminal,
the content management server transmits, to the client terminal, the management server ID identifying the content management server and a request to delete or disable playback of the content,
the client terminal
receives the management server ID and the request to delete or disable the playback of the content from the content management server,
determines whether or not the received management server ID matches the management server ID saved in the removable media,
upon them matching, deletes or disables the playback of the content saved in the removable media, the content corresponding to the deletion request or playback disabling request, and
in response to completion of the process of deleting or disabling the playback of the content, transmits process completion information and the identification number of the removable media to the content management server; and
the content management server stores and saves the identification number of the removable media and collectively tracks deleted and active statuses of distributed removable storage media based on collected identification numbers received from a plurality of client terminals.

2. The content management system according to claim 1, wherein
at the time of recognition of the content ID corresponding to the content, the client terminal transmits, to the content management server, the content ID and a check request for deletion or disabling the playback of the content, and
the content management server checks deletion necessity or playback disabling necessity registration information where whether or not the content ID corresponding to the check request is required to be deleted or disabled for playback is stored and saved, and upon the content ID being required to be deleted or disabled for playback, transmits a request to delete or disable the playback of the content corresponding to the content ID.

3. The content management system according to claim 1, wherein
the content is saved on the client terminal side, corresponding to a view expiry date, and
the client terminal side deletes or disables the playback of the content corresponding to the view expiry date in response to recognition that the view expiry date is due.

4. The content management system according to claim 2, wherein the content is saved on the client terminal side, corresponding to a view expiry date, and the client terminal side deletes or disables the playback of the content corresponding to the view expiry date in response to recognition that the view expiry date is due.

5. A content management server to be connected via a communication network to a client terminal that has a removable media configured to store and save a management server ID identifying the content management server, a content ID of the content where the process has been completed stored on the removable media, and an identification number of the removable media, the client terminal being available for (a) receiving a management server ID and a request to delete or disable playback of the content from the content management server, (b) determining whether or not the received management server ID matches the management server ID saved in the removable media, and upon them matching, deleting or disabling the playback of the content saved in the removable media, the content corresponding to the deletion request or playback disabling request, and (c) in response to completion of the process of deleting or disabling the playback of the content, transmitting process completion information, the content ID of the content where the process has been completed, and the identification number of the removable media to the content management server, comprising:

the content management server being configured to transmit the management server ID identifying the content management server and the request to delete or disable the playback of the content to the client terminal, the content management server being configured to receive, from the client terminal, the deletion or playback disabling process completion information, the content ID of the content where the process has been completed, and the identification number of the removable media, and the content management server being configured to bring the content ID and the identification number of the removable media into correspondence to store and save the content ID and the identification number and to collectively track deleted and active statuses of distributed removable storage media based on collected identification numbers received from a plurality of client terminals.

6. The content management server according to claim 5, wherein the content management server is configured such that upon receiving a client terminal transmission of the content ID corresponding to the content and a check request for deletion or disabling of the playback of the content at the time of recognition of the content ID, the content management server checks deletion necessity or playback disabling necessity registration information where whether or not the content ID corresponding to the check request for deletion or disabling of the playback of the content is required to be deleted or disabled for playback is stored and saved in accordance with the check request, and upon the content ID being required to be deleted or disabled for playback, transmits the request to delete or disable the playback of the content corresponding to the content ID.

7. A tangible and non-transitory computer readable medium having a management program causing a server to perform the functions of:

communicating via a communication network with a client terminal for (a) storing and saving, in a removable media connected for communication by detachable attachment, a management server ID identifying a content management server, a content ID of the content where the process has been completed stored in the removable media, and an identification number of the removable media, (b) receiving a management server ID and a request to delete or disable playback of the content from the content management server, determining whether or not the received management server ID matches the management server ID saved in the removable media, upon them matching, deleting or disabling the playback of the content saved in the removable media, the content corresponding to the deletion request or playback disabling request, and (c) in response to completion of the process of deleting or disabling the playback of the content, transmitting process completion information, the content ID of the content where the process has been completed, and the identification number of the removable media to the content management server, the server transmitting the management server ID identifying the content management server and the request to delete or disable the playback of the content via communication network to the client terminal; and the server receiving the deletion or playback disabling process completion information, the content ID of the content where the process has been completed, and the identification number of the removable media, from the client terminal via the communication network, and the server bringing the content ID and the identification number of the removable media into correspondence to store and save the content ID and the identification number and collectively tracking deleted and active statuses of distributed removable storage media based on collected identification numbers received from a plurality of client terminals.

8. A client terminal to be connected to a content management server via a communication network, the client terminal to which a removable media is connected for communication by detachable attachment, the removable media for storing and saving a management server ID identifying the content management server, a content ID that identifies content stored in the removable media, and an identification number of the removable media, the client terminal being configured to, in accordance with a management server ID received from the content management server, the management server ID identifying the content management server, and a request to delete or disable playback of the content, determine whether or not the received management server ID matches the management server ID saved in the removable media, and upon them matching, delete or disable the playback of the content saved in the removable media, the content corresponding to the deletion request or playback disabling request, and in response to completion of the process of deleting or disabling the playback of the content, transmit process completion information and the identification number of the removable media to the content management server for the content management server to collectively track deleted and active statuses of distributed removable storage media based on collected identification numbers received from a plurality of client terminals.

9. A tangible and non-transitory computer readable medium having a management program for causing a client terminal to perform the functions of:

storing and saving in a removable media a management server ID identifying a content management server, a content ID that identifies content stored in the removable media, and an identification number of a removable media;

receiving a management server ID from a content management server, the management server ID identifying the content management server, and receiving a request to delete or disable playback of the content from the content management server;

determining whether or not the received management server ID matches the management server ID saved in the removable media, and upon them matching, deleting or disabling the playback of the content saved in the removable media, the content corresponding to the deletion request or playback disabling request; and in response to completion of the process of deleting or disabling the playback of the content, transmitting process completion information and the identification number of the removable media to the content management server for the content management server to collectively track deleted and active statuses of distributed removable storage media based on collected identification numbers received from a plurality of client terminals.

* * * * *